Sept. 22, 1964 J. GREENSPAN 3,149,554
TENDERIZING MACHINE
Filed Feb. 27, 1963
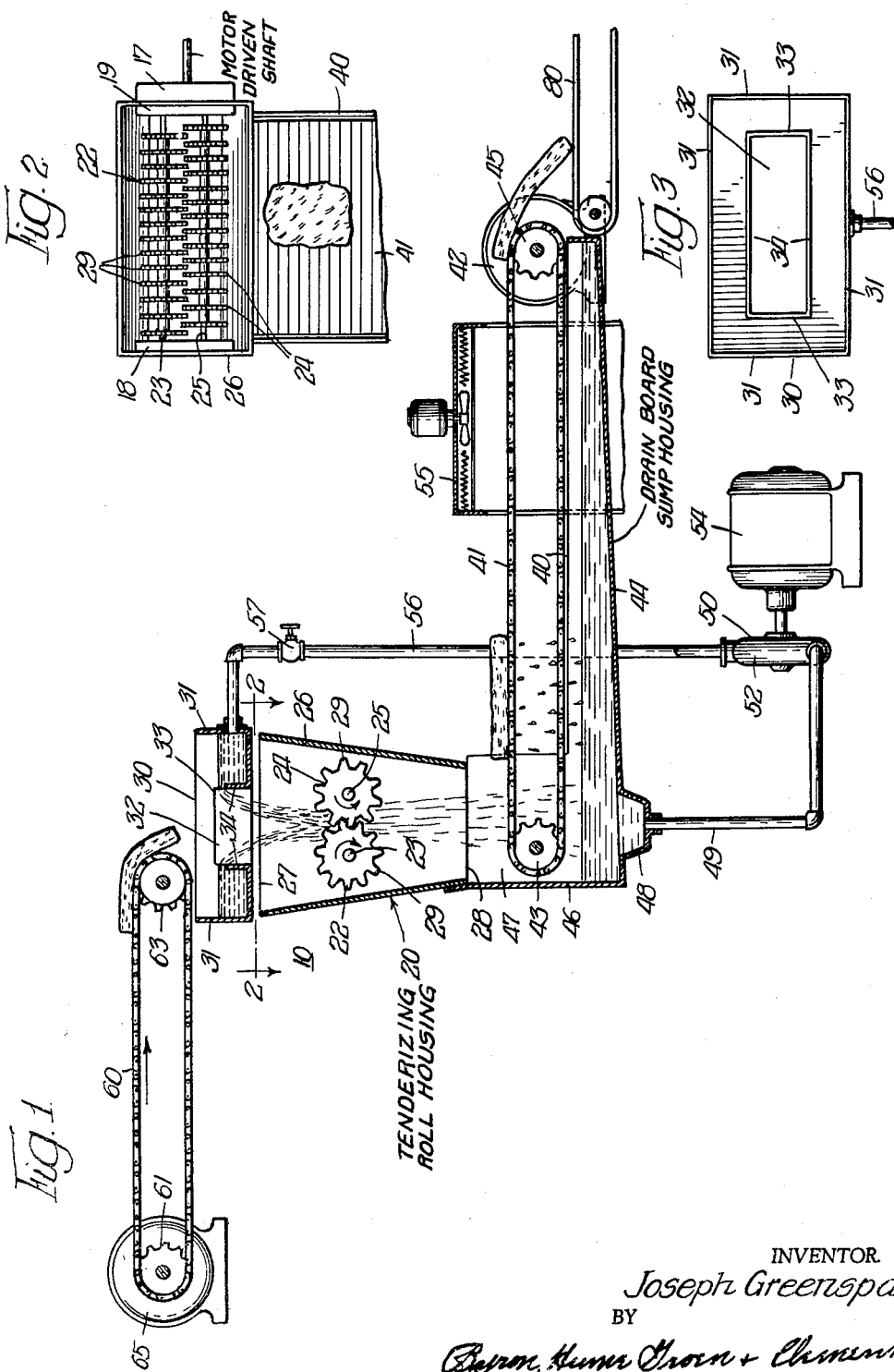
INVENTOR.
Joseph Greenspan,
BY

United States Patent Office 3,149,554
Patented Sept. 22, 1964

---

3,149,554
TENDERIZING MACHINE
Joseph Greenspan, Evergreen Park, Ill., assignor, by mesne assignments, to Frigidmeats, Inc., Chicago, Ill., a corporation of Illinois
Filed Feb. 27, 1963, Ser. No. 261,290
4 Claims. (Cl. 99—254)

The present invention relates to meat tenderizer machines and particularly to a new and improved device adapted to bathe and impregnate meat cuts with tenderizing solution and thereafter to drain the same in preparation for further processing.

Tenderizer solutions have proven quite successful in making some cuts of meat more acceptable for consumption. The problem normally met in the use of liquid tenderizers is that of achieving a balance between using too little tenderizer whereby it is ineffective and using too much whereby the meat is made mushy and unpalatable.

It is a general object of the present invention to provide a new and improved tenderizing machine whereby a tenderizer solution can be bathed over and injected into a cut of meat in a controlled manner so as to render the meat properly tenderized throughout its thickness.

Another object of the invention is to provide a new and improved tenderizer machine and process for effecting a more even distribution of liquid tenderizer both over the surface and throughout the thickness of a cut of meat whereby more uniform tenderization of a cut of meat is achieved with a more dilute solution of liquid tenderizer.

A more specific object of the invention is to provide a new and improved tenderizer machine including a pair of piercing rollers mounted closely spaced apart for rotation relative to one another so that meat passed therebetween is pierced simultaneously at both surfaces by the rollers and flooded with tenderizer solution in a manner so that the meat is both bathed and injected with tenderizer solution simultaneously with the piercing of the meat cut.

A more specific object of the invention is to provide a new and improved meat tenderizing machine capable of both physically and chemically tenderizing the meat cuts by simultaneously bathing and perforating a meat cut so as to cut the sinewy portions of the meat and to inject into the interior of the meat tenderizer solution capable of chemically tenderizing the meat, and to thereafter drain excess tenderizer from the meat so as to control and regulate the degree of chemical tenderization.

A more specific object of the invention is to provide a pair of rolls including therein perforating knives wherein the rolls are mounted and spaced apart so as to vertically feed meat cuts therethrough and pierce the same on both sides by action of the piercing knives. There is also provided an overflow trough for tenderizing solution whereby the same spills directly onto the tenderizing rolls and into the gap between the axes thereof so as to bathe the meat cuts as it traverses between the rolls and to inject tenderizing solution into the meat simultaneously with piercing thereof. The treated meat is received on a drain belt whereby the excess tenderizing solution is removed and collected in a sump for recirculation to the overflow trough. Meat tenderized according to this process is both physically masticated and chemically injected for tenderizing.

Further objects and features of the invention pertain to the particular arrangement and structure whereby the above identified objects and other features are attained.

The invention, both as to its scope and method of operation, will be understood by reference to the following specification and drawings forming a part thereof wherein:

FIGURE 1 is a schematic representation in cross-sectional form of an exemplary meat tenderizing system in accordance with the present invention;

FIGURE 2 is a cross-sectional view taken along lines 2—2 of FIGURE 1; and

FIGURE 3 is a top view of the trough 30 shown in FIGURE 1.

Referring to the drawings there is shown in FIGURE 1 a tenderizer machine 10 including a tenderizer roll housing 20, an overflow trough 30 associated therewith, a drain board and sump housing 40, a recirculation pump 50 connected between the sump housing 40 and the overflow trough 30.

The tenderizer roll housing 20 includes a pair of tenderizer rolls 22 and 24 mounted for rotation about parallel axes 23 and 25, respectively, in a tapered chute 26 open at both its ends 27 and 28. Each of the rolls 22 and 24 are provided with a plurality of axially spaced rotary cutting blades 29, the teeth of which are arranged for overlap as shown in FIGURE 2. The rolls 22 and 24 are secured in position at their axes 23 and 25 in end blocks 18 and 19 connected to the end walls of the housing 26 and are driven for counter rotation through a gear box 17 by a motor not shown. As best illustrated in FIGURE 1, the roll 22 is rotated in a clockwise direction and the roll 24 is rotated in a counterclockwise direction whereby a cut of meat traversing the tenderizing roll housing 20 from the opening 27 to the opening 28 passes between the rolls 22 and 24 and is cut to a center depth by action of the cutter knives 29. Spacing between the perforating knives should be adjustable as by varying the spacing between the axes 23 and 25 in the gear box 17 and end blocks 18 and 19 or by exchange of the cutting blades 29.

Disposed over the opening 27 in the tenderizing roll housing 20 is the fluid overflow trough 30. As shown in FIGURE 3 the trough 30 is rectangular having high outside walls 31 and a center aperture 32. The center aperture is defined by a pair of oppositely disposed upstanding end walls 33 joined by upstanding oppositely disposed side walls 34. The side walls 34 are of a lower height than the outside walls 31 and the end walls 33 so that fluid overflow from the trough flows over the walls 34 and through the aperture 32.

The overflow trough is positioned relative to the tenderizing roll housing 20 so that the overflow of fluid through the aperture 22 falls substantially along the length of the rolls 22 and 24, bathing the same and particularly the knives 29 thereof in the area of overlap as best shown in FIGURE 1.

Disposed beneath the tenderizing roll housing 20 and in communicating relationship with the aperture 28 thereof is the drain board and sump housing 40. This unit is comprised essentially of an endless belt 41 disposed at the one end directly beneath the open end 28 of the tenderizing roll housing 20, and driven at the other end by a motor 42. Disposed in this belt 41 is a drain pan 44 which terminates in a sump 48 and outlet 49 extending to the hydraulic pump 50. In order to prevent splash of the liquid tenderizer which is discharged from the aperture 28, the drain board and sump housing 40 is equipped with upstanding sides 46 and 47 communicating directly between the drip pan 44 and the lower end of the tenderizer roll housing 20. The endless belt 41 is preferably of a perforated type and may be, for example, a flat metal linked chain mounted on sprockets 43 and 45 whereby the bathed meat cuts are permitted to drain through the belt into the drip pan 44.

A feeder belt 60, as shown in FIGURE 1, while not essential to the practice of the invention does provide the convenience of a means for moving meat cuts from a cutting table, for example, into the tenderizer machine on a constant one at a time basis. As shown in FIGURE 1, the feeder belt 60 is mounted on sprockets 61 and 63 driven by a motor 65. The end of the belt supported at the sprocket 63 is arranged so that meat carried to the end of the belt falls therefrom directly into and through the aperture 32 of the overflow trough 30. Although optional, another endless belt 80 is shown associated with the belt 41 of the drain board and sump housing 40.

The hydraulic pump 50 is made up of a pump unit 52 driven by a motor 54. The pump unit 52 is applied with liquid tenderizer from the return outlet 49 and in turn supplies liquid tenderizer to the conduit 56 supplying the inlet to the overflow trough 30 through a flow regulator valve 57.

Giving understanding to the manner in which the arrangement in accordance with the invention is employed, a quantity of liquid tenderizer is mixed and supplied in the pan 44 in sufficient quantity so as to provide a constant fluid flow in the path through their hydraulic pump 50 to the overflow trough 30 and therefrom to bathe the knives of the cutter rolls 22 and 24. By way of example, an appropriate tenderizer solution may be a commercially available enzyme preparation such as sold by Freezer Laboratories of Chicago, Illinois, under the name "FM-102 Meat Tenderizer." Cuts of meat of a uniform thickness commensurate with the spacing between the rolls 22 and 24 are supplied from cutting tables to the endless belt 60 wherein the same drop from the end of the endless belt into the aperture 32 in the trough 30, and are caught on the blades 29 of the rolls 22 and 24. During the course of fall through the aperture 32 and during the interval of traverse between the knives 29 of the rolls 22 and 24, the meat is bathed in the tenderizer solution over the entire surface thereof and the knives themselves which are moistened with the liquid tenderizer perforate the depth of the meat so as to impregnate the same with the liquid tenderizer thereon. After traverse through the rolls 22 and 24 the meat is deposited on the belt 41 of the drain board and sump housing 40 and progressed by the belt 41 slowly across the length of the drip pan 44. During the course of travel, the excess liquid tenderizer is dripped therefrom into the return pan and also air dried to preserve in the processed cut of meat only that appropriate amount of tenderizer which will be effective for rendering the meat tender.

Alternatively, the belt 41 and drain board 44 may be enclosed in a tunnel 55 including heaters and a blower by means of which heated air or gas can be circulated over the meat to limit weight pick-up as desired or to preserve the color of the meat. At the end of the traverse across the endless belt 41 the meat is deposited on a transport belt 80 whereupon the meat is disposed of as by storage or packaging for shipment.

Preferentially, the process is carried out at a reduced temperature and the meat is finally received on the belt 80, is frozen subsequently in order to deactivate the tenderizer solution until the cuts of meat are needed for use.

The cutter rolls 22 and 24 and knives therefor used in the present invention are those such as are in common use in meat tenderizer machines such as are common to the meat industry. The use of knives on the roller serves the double purpose of severing the sinewy parts of the meat and also injecting the meat with liquid tenderizer, but it is understood that the knives are not essential to the practice of their invention and that needle point rollers could be used just as well in their stead. It is understood that by virtue of the arrangement of the present invention standard cuts of meat can be quickly processed, tenderized and packed according to a strict control schedule whereby each cut of meat of the same grade is tenderized to exactly the same degree.

It is understood that variations and modifications may be made in the arrangement of the present invention and it is intended to cover in the appended claims all such variations and modifications as fall within the true spirit and scope of the invention.

I claim:

1. A meat tenderizer comprising a pair of piercing tenderizer rolls mounted closely spaced apart and axially parallel for rotation relative to one another, whereby meat passed between said rolls is pierced simultaneously on opposite surfaces thereof, a supply of liquid meat tenderizer solution, means for flooding the area between the axes of said pair of rollers with said tenderizer solution, thereby to bathe the surfaces of said meat and to inject tenderizer solution into said meat simultaneously with the piercing thereof, and means for removing excess tenderizer solution from said meat cuts subsequent to bathing and injection thereof.

2. A meat tenderizer comprising a pair of piercing tenderizer rolls mounted closely spaced apart and axially parallel for rotation relative to one another, whereby meat passed between said rolls is pierced simultaneously on opposite surfaces thereof, a housing enclosing said rolls and open at both ends of the meat traverse path between said rolls, a supply of liquid meat tenderizer solution, means for flooding said rolls and said meat in traverse therebetween with said liquid meat tenderizer, thereby to bathe the surfaces of the meat with tenderizer solution and to inject tenderizer solution into said meat simultaneously with the piercing thereof, and means for removing said meat cuts of excess tenderizer subsequent to bathing and injection and returning the same to said supply.

3. A meat tenderizer comprising a pair of piercing tenderizer rolls mounted closely spaced apart and axially parallel for rotation relative to one another, whereby meat passed between said rolls is pierced simultaneously on opposite surfaces thereof, a housing enclosing and supporting said rolls to define a vertical meat traverse path between the rolls, said vertical housing being open at the top and the bottom thereof, a supply of liquid meat tenderizer solution, an overflow trough positioned adjacent the open top end of said housing for flooding said rolls with liquid meat tenderizer solution, whereby the surfaces of said meat are bathed with tenderizer solution and said meat is injected with tenderizer solution upon piercing thereof, transport means for receiving said bathed and injected meat at the bottom opening of said housing and moving said meat therefrom, a drain basin associated with said transport means for receiving the flow of fluid from said housing and the drain of excess fluid from said transport means, and a fluid pump between said drain basin and said overflow trough for recirculating said supply of liquid meat tenderizer solution.

4. A meat tenderizer comprising a pair of piercing tenderizer rolls mounted closely spaced apart and axially parallel for rotation relative to one another, whereby meat passed between said rolls is pierced simultaneously on opposite surfaces thereof, said piercing tenderizer rolls being made up of a plurality of spaced rotary knives the blades of which as between rolls are axially staggered and radially overlap to pierce meat to the central depth thereof, a housing enclosing and supporting said rolls to define a vertical meat traverse path between the rolls, said vertical housing being open at the top and the bottom thereof, a supply of liquid meat tenderizer solution, an overflow trough positioned adjacent the open top end of said housing for flooding said rolls with liquid meat tenderizer solution, said overflow trough having a central aperture therein through which meat is fed to said tenderizer rolls and through which said liquid tenderizer flows in flooding said rolls, whereby the surfaces of said meat are bathed with tenderizer solution and said meat is injected with tenderizer solution upon piercing thereof, transport means for receiving said bathed and injected meat at the bottom opening of said housing and moving said meat therefrom, a drain basin associated with said transport means for receiving the flow of fluid from said housing and the drain of excess fluid from said transport means, and a fluid pump between said drain basin and said overflow trough for recirculating said supply of liquid meat tenderizer solution.

References Cited in the file of this patent

UNITED STATES PATENTS 2,895,162     Harris                 July 21, 1959